United States Patent [19]

Tchernev

[11] Patent Number: 5,251,458
[45] Date of Patent: Oct. 12, 1993

[54] PROCESS AND APPARATUS FOR REDUCING THE AIR COOLING AND WATER REMOVAL REQUIREMENTS OF DEEP-LEVEL MINES

[76] Inventor: Dimiter I. Tchernev, 75 Middlesex Ave., Natick, Mass. 01760

[21] Appl. No.: 746,893
[22] Filed: Aug. 19, 1991
[51] Int. Cl.$^5$ .................... F25D 17/08; B01D 47/00
[52] U.S. Cl. ........................................ 62/271; 62/91; 62/92; 95/123
[58] Field of Search .................. 62/91, 92, 271; 55/33, 55/35

[56] References Cited

U.S. PATENT DOCUMENTS

| | | | |
|---|---|---|---|
| 2,525,045 | 10/1950 | Richardson | 62/271 |
| 2,536,081 | 1/1951 | Pennington | 62/91 |
| 2,727,365 | 12/1955 | Rosell | 454/168 |
| 2,811,223 | 10/1957 | Newton | 62/92 |
| 3,398,510 | 8/1968 | Pennington | 55/35 |
| 3,470,708 | 10/1969 | Weil et al. | 62/271 |
| 3,844,737 | 10/1974 | Macriss et al. | 55/34 |
| 3,890,797 | 6/1975 | Brown | 62/92 |
| 4,012,206 | 3/1977 | Macriss et al. | 55/34 |
| 4,081,024 | 3/1978 | Rush et al. | 165/62 |
| 4,113,004 | 9/1978 | Rush et al. | 62/271 |
| 4,134,743 | 1/1979 | Macriss et al. | 55/34 |
| 4,207,084 | 6/1980 | Gardner | 55/181 |
| 4,365,979 | 12/1982 | Takeyama et al. | 55/181 |
| 4,402,717 | 9/1983 | Izumo et al. | 55/388 |
| 4,480,444 | 11/1984 | Conan | 62/238.3 |
| 4,574,874 | 3/1986 | Duran | 156/43 |
| 4,701,189 | 10/1987 | Oliker | 55/34 |
| 4,730,462 | 3/1988 | Rogers | 62/91 |
| 4,769,053 | 9/1988 | Fischer, Jr. | 55/389 |
| 4,775,484 | 10/1988 | Schmidt et al. | 210/673 |
| 4,887,438 | 12/1989 | Meckler | 62/271 |
| 4,971,611 | 11/1990 | Noguchi | 55/181 |

OTHER PUBLICATIONS

Zeolite Molecular Sieves, Structure, Chemistry, and Use, Donald W. Breck, pp. 705 and 706, 1984.
An Assessment of the Energy Requirements for Deep-Level Mine Cooling, D. Dawes et al., pp. 1373–1396, 1990.
Refrigeration Systems for a Deep-Level Mine, F. Lloyd et al., pp. 1333–1337, 1990.
The Development of a Refrigeration System at Depths Between 3,500 and 4,000 Meters Below Surface, P. J. Jansen Van Rensburg, pp. 1357–1363, date unknown.
Ventilation and Refrigeration Requirements for a Semi--Mechanized Mining Method at Freegold North—No. 1 Shaft Project, D. J. Hoffman et al., pp. 1347–1355, 1990.
The Optimal Use of Thermal Insulation for Chilled Water Pipes in Mine Cooling Systems, R. Ramsden et al.; pp. 1339–1346, 1990.
Ventilation and Refrigeration Considerations in the Design of a Deep, Hot Gold Mine Using Trackless Operations, A. M. Patterson, pp. 1323–1332, 1990.
Sorption Dehumidification and Pressure Drying Equipment, 1988 Equipment Handbook, pp. 7.1–7.8.
Desi/Air, The Latent Air Condition, ICC Technologies; pp. 1–12, date unknown.
Ventilation Arrangements for Merensky Reef Exploitation Below 1,000 m Depth at Rustenburg Platinum Mines Ltd. Union Section: by D. J. Stanton et al., pp. 1365–1372, 1990.

*Primary Examiner*—John Rivell
*Assistant Examiner*—L. R. Leo
*Attorney, Agent, or Firm*—Penrose Lucas Albright

[57] ABSTRACT

An apparatus and method for conditioning air in deep, underground mines. The apparatus includes an air passageway connecting an air inlet for ambient air and an air outlet for conveying dried air to the mine's working level. The air passageway provides for dehumidification of the air by passing it through activated adsorbent particles, preferably zeolite, and for reactivating the particles by reverse heating cycles, or revolving the adsorbent beds through separate air flows, one for dehumidification of the air, and the other for regeneration of the adsorbent particles. The dehumidification unit contained within the air passageway is sufficiently efficient to reduce the moisture content of the air to less than 0.001 kilograms of water per kilogram of air. A humidifier at the mines's working level receives the dried air at an increased pressure and temperature due to the mine's depth, and by evaporative cooling reduces the air temperature so that it is cooled to 25° C. dry bulb/20° C. wet bulb, or less. The humidified air is exhausted to the mine's surface carrying moisture with it.

20 Claims, 3 Drawing Sheets

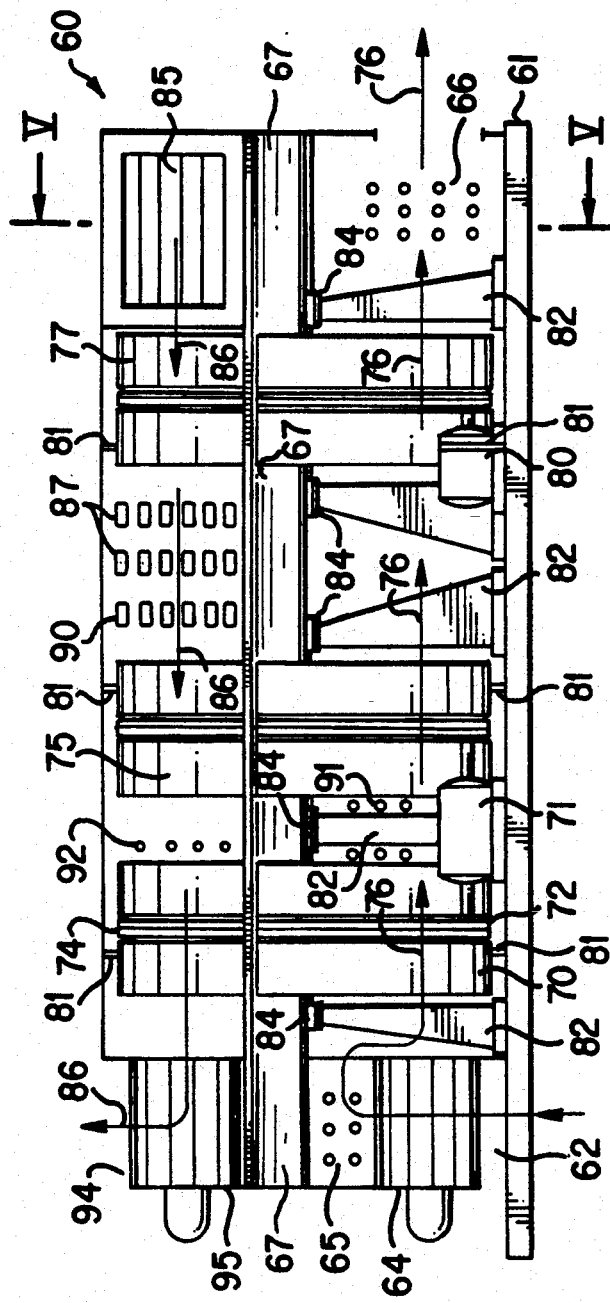
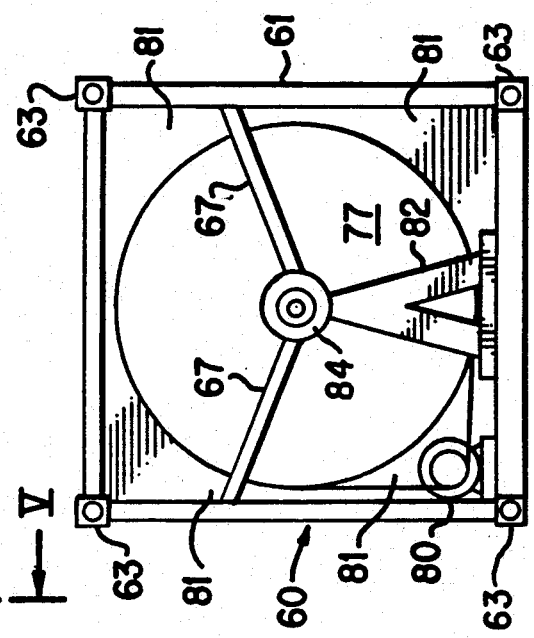
FIG.4
FIG.5

PROCESS AND APPARATUS FOR REDUCING THE AIR COOLING AND WATER REMOVAL REQUIREMENTS OF DEEP-LEVEL MINES

FIELD OF THE INVENTION

This invention relates to a method and apparatus for reducing requirements for the cooling of ventilation air, and the removal of water from underground mines, particularly for mines having depths of 3,000 or more meters under the surface.

BACKGROUND OF THE INVENTION

In mining, more than any other industry, there is a lack of conformity with regard to the processes, machinery and equipment which are utilized as well as in the resulting products which militates against standardization and the application of automated processes and machinery. However, in common with many other heavy engineering activities, mining is essentially a large scale exercise in material handling, albeit of a complexity probably much greater than in any other industry. Thus, not only must large tonnages of minerals and ores be moved for distances up to fifteen kilometers or more underground, but also provision must be made for ventilation air and its circulation, and this and the water handling systems involved may require much greater energy than the haulage of the rock and ores.

Moreover, in mines at depths between 3,500 and 4,000 meters below the surface, virgin rock temperatures may be as much as 65° C. Under such temperature conditions, it is virtually impossible for ventilation air, as such, to provide sufficient cooling, but rather it is used as a medium for absorbing and conveying the unwanted thermal energy from the site. A temperature of 28° C. wet bulb, considered the maximum for sustained operations in such mines, can only be maintained by providing refrigeration to the ventilation air at the working level and particularly at the working site. In existing mines at this depth, the refrigeration is provided in several different fashions. Basically, the air is conveyed through at least two bulk air coolers, wherein the air is cooled by water chilled to as low as 0.5° C. at the mine's surface. Ice machines may be used in conjunction with such a system. Pelton wheels are frequently strategically incorporated into the system, coupled to induction generators to produce electric power fed back into the mine's electrical network. Water introduced into the mine for various purposes is pumped to the surface by high lift pumps.

Concerning refrigeration systems for cooling the chilling water, ammonia systems that place the evaporator at or near the working level within the mine would, in theory, be of considerable advantage in that the power consumption is relatively low and the design is relatively simple. Unfortunately, the use of ammonia as a refrigerant within the mine entails safety aspects, and thus is generally avoided.

In any consideration of the ventilation system for deep-level mines, the problems of adjusting to existing mine layouts and equipment must be considered. Included are problems associated with providing wholesome air to the underground workers, diluting exhaust fumes from diesel-fueled trackless equipment, carrying away dust created by blasting and other mining operations, and the need to optimize operational assets to achieve maximum efficiency. Existing systems may have three-chamber pipe feeders, wherein the vertically descending chilled water from the surface refrigeration plant is utilized to assist lifting warm service water to the surface.

Further, as indicated above, in deep-level mines, the average face temperature is invariably unacceptably high without provision for underground cooling, which is normally obtained by chilled water, but may be augmented by the introduction of ice. To maintain the temperature less than an operational maximum of about 27° C. or 28° C. wet bulb, eventually the water flow consumption to meet the requirements of bulk air cooling becomes unacceptable, depending largely upon the depth of the mine and the amount of excess thermal energy that must be removed.

Other parameters which should be taken into account in designing ventilation air and water systems for deep-level mines include the friction heating of both water and air which must be conducted to the working levels. In addition, there is a significant adiabatic increase in air temperatures due to the increased pressures at lower levels, and the temperature of the rock also increases with the depth of the mine. Thus, even with high grade ores, a currently accepted point of diminishing returns is reached at a depth of about 4,000 meters. This includes providing for the additional use of ice, which is transported to the working level, or to intermediate working level, to enhance the cooling effect of existing ventilation air systems.

Technical problems relating to air ventilation and in deep-level mining are covered in some detail by articles presented at the International Deep Mining Conference in Johannesburg, SAIMM, 1990, published within TECHNICAL CHALLENGES IN DEEP-LEVEL MINING, pages 1323-1396:

*Ventilation and Refrigeration Considerations in the Design of a Deep/Hot Gold Mine Using Trackless Operations*, by A. M. Patterson, p. 1323;

*Refrigeration Systems for a Deep-Level Mine*, by F. Lloyd and J. P. Cronje, p. 1333;

*The Optimal use of Thermal Insulation for Chilled Water Pipes in Mine Cooling Systems*, by R. Ramsden, H. J. M. Rose and B. J. Wernick, p. 1339;

*Ventilation and Refrigeration Requirements for a Semi-Mechanized Mining Method at Freecold North—No. 1 Shaft Project*, by D. H. Hoffman and J. D. Wessels, p. 1347;

*The Development of a Refrigeration System at Depths Between 3,500 and 4,000 Meters Below Surface*, by P. J. Jansen van Rensburg, p. 1357;

*Ventilation Arrangement for Merensky Reef Exploitation Below 1,000 m Depth at Rustenburg Platinum Mines Ltd—Union Section*, by D. J. Stanton and G. A. C. Viljoen, p. 1365;

*An Assessment of the Energy Requirements for Deep-Level Mine Cooling*, by D. Dawes, P. G. Lloyd and J. J. E. A. Francen, p. 1373.

These articles are incorporated by reference herein.

SUMMARY OF THE INVENTION

An object of the instant invention is to increase the effective working depth of existing deep-level mines by improvements in the ventilation air system and, at the same time, to reduce current requirements relating to the introduction into and the removal of water from the mine. A further objective is to reduce refrigeration requirements as well as the amounts of water introduced into existing deep-level mines and pumped therefrom to the surface. It also is an object of the invention to provide apparatuses and processes for installation and use at new mines that minimize a need for extensive refrigeration systems at the mine's surface, and improve operation of the mine while reducing its cost of operation.

The apparatus and method in accordance with the invention reduce the cost of mining operations of deep-level mines for operations at present levels, and extend economical operational working levels of deep-level mines for an estimated 1,500 to 3,000 meters below the currently considered depth limits based on safety, temperature and economical operations of deep-level mines.

The objects and advantages of the invention are obtained by providing evaporative cooling in deep underground mines through predrying the necessary ventilation air at the surface to a moisture content of less than 0.001 kilogram of moisture per kilogram of dry air, utilizing for this purpose sorption drying and then, at the operational working level in the mine, cooling the dry air by evaporative cooling through the absorption of moisture into that dry air. The method also reduces requirements for pumping underground water from the working level inasmuch as a significant amount of water vapor is carried by the ventilation air exhausted from the mine. For existing mines and new mines, the refrigeration plant capacity and the amount of chilled water or ice required to be pumped or otherwise conveyed to the working level of a mine, as well as the size of pipes and pumps necessary to carry water into and out of the mines, is substantially reduced.

An advantage of the invention is that commercially available equipment may, with comparatively modest modifications, be installed in combination with existing equipment at the mines' plants located on the surface, for the effective practice of the invention with little or no disruption of the mines' operations, or equipment may be manufactured specially for adaption to existing mines, or for new mines and installed with, again for existing mines, little or no disruption of ongoing mining operations. Moreover, the design of the equipment to be installed, and the system, as such, is relatively simple, an important consideration in view of the needs for ensuring safe, effective and economical mining operations.

Other objects, adaptabilities and capabilities will appear as the description progresses, reference being had to the accompanying drawings:

BRIEF DESCRIPTION OF THE DRAWINGS

FIG. 4 illustrates in diagrammatical fashion a further unit for drying air entering the mine, wherein there is a continuous regeneration of the solid desiccant material mounted in a wheel, the unit also including a heat exchange wheel; and FIG. 5 is a diagrammatical front elevational sectional view taken on line V—V of FIG. 4 which illustrates the disposition of a wheel in the apparatus illustrated in FIG. 4.

DESCRIPTION OF THE PREFERRED EMBODIMENTS

Figure 1:
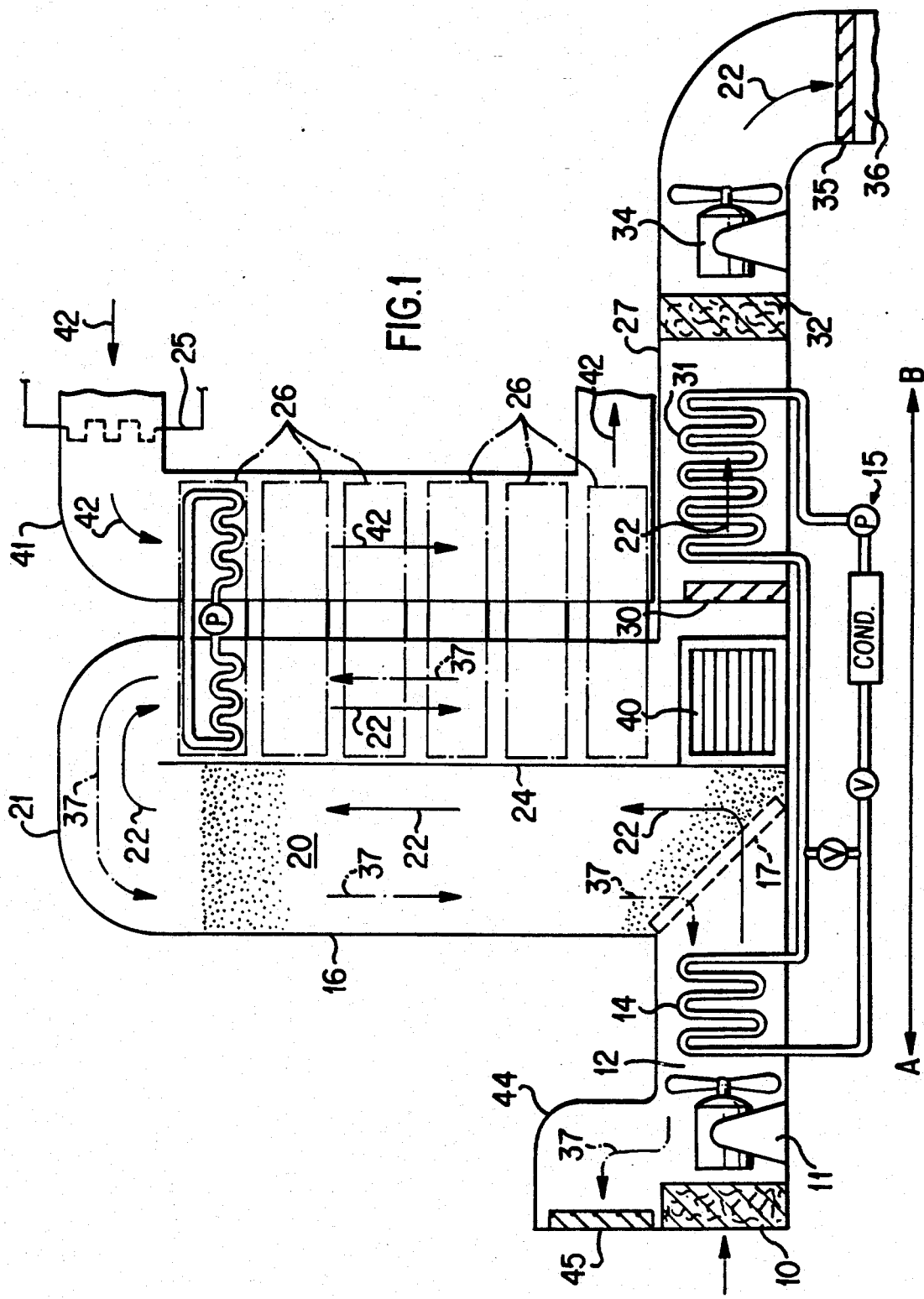
FIG. 1 is a diagrammatical side elevational view of a drying unit for adsorbing moisture in air to be conveyed to the working levels of a mine, and for reactivating the desiccant material by waste heat gas or the like, and reversing flow of air through the unit.

In considering whether or not the drying or removal of moisture from air used for ventilation in deep-level mines is economically advantageous, there are certain parameters to be taken into account. Deep-level mines are generally defined as those mines wherein the depth below the surface is in excess of 2,000 meters, extending possibly to depths as low as 7,000 meters. At such depths, there is a significant increase in the ambient atmospheric pressure, the temperature of the ambient air being increased adiabatically as a result of the pressure increase. Considering the temperature increase will be about 6.5° C. for each kilometer of depth, at 4,000 meters, without considering any other effects other than adiabatic temperature increases, the air temperature is increased by 26° C. In other words, air entering at the surface at 32° F. will have its temperature increased to 79° F. at an underground level of 2.5 miles.

Evaporation of one pound of water at ambient temperature produces approximately 1,050 BTU's of cooling or 2.2 BTU's cooling per gram water.

A typical surface temperature for South Africa mines is 25° C. dry bulb/20° C. wet bulb (77° F. dry bulb/68° F. wet bulb). This corresponding to about 0.014 pound of water per pound of dry air (or kilogram water/kilogram dry air). Drying the air to 0.001 pound of water per pound of dry air removes about 0.013 pounds of water or 13 BTU's per pound of dry air. A more conservative design based on 15° C. (59° F.) wet bulb temperature corresponding to about 0.007 pound of water per pound of dry air, if predried to 0.001 pound of water per pound of air before the air is used for ventilation, about 7 BTU's per pound of air have been removed. Predrying is accomplished at the surface before the air is blown down the mine shaft.

At the bottom of the mine the requisite maximum wet bulb temperature of the air at operating sites is 28° C. (82.5° F.). This equates to 0.022 pound of water per pound of dry air. Therefore, by introducing, via evaporation, into one pound of air having 0.001 pound of water therein an additional 0.021 pound of water, 22 BTU's of cooling ($0.021 \times 1050 = 22$) will be produced for every pound of dry air to which the 0.021 pound of water is so added. This converts to a cooling effect of 48.5 BTU's per kilogram of dry air introduced into the mine's lower level. Thus, each kilogram of dry air flow per second produces an equivalent of 51 kw ($48.5 \times 1.06$) of cooling.

Conventional air drying techniques are known that have a capacity to reduce the air water vapor content to less than 0.001 kilogram moisture per kilogram air, corresponding to 25° C. dry bulb/10° C. wet bulb conditions or to 5 to 10% relative humidity of the dried air. This ventilation air is then heated by ambient conditions in the deep mine and the humidity increased to a 28° C. wet bulb temperature corresponding to about 0.02 kilogram moisture per kilogram dry air. The evaporative cooling that results from the increase in humidity is thus equivalent to about 50 kilowatts of refrigeration for each kg/second ventilation rate. Ventilation rates for mines vary from 400 kg/second reflected in the article of Stanton and Viljoen for the Rustenburg platinum mine (corresponding to 20 MW refrigeration) to 700 kg/second as set forth in the Patterson for the Western area gold mine (corresponding to 37 MW refrigeration). This permits a reduction of 30 to 50% of the surface refrigeration plant capacity. Even if the ventilation air is precooled, the dehumidification which occurs in such cooling process is currently performed by the refrigeration plant and therefore predrying prior to cooling the air will permit reduction of its capacity by the same percentage. Assuming the most conservative conditions of 15° C. wet bulb ambient air at the surface, a cooling capacity of 20 KW refrigeration for each kg/second ventilation air rate still results.

At the stated capital cost of 300 million Rand (approximately $100 million at current exchange rates) for a 70 MW refrigeration capacity plant, such a reduction corresponds to a reduced capital outlay of $10 to $30 million, depending on the refrigeration plant size. Further capital cost reductions are realized from smaller chilled water pipe sizes and pumps. Additional operating cost reductions save up to 50% in operational energy cost for the refrigeration plant, reductions in power needs for pumping, and through the potential use of waste heat from power plants for regeneration of the air dryers.

From the foregoing, it will be appreciated that, considering both initial capital and operating investments reductions of 30 to 50% are possible by predrying the ventilation air of deep mines to about 0.001 kg water/kg air and extracting thermal energy via the latent heat of evaporation in the lower depth working areas.

There are a variety of methods and types of apparatus which are known for providing effective sorption dehumidification. These are discussed in Chapter 7 of the 1988 ASHRAE Handbook, Equipment Volume.

There are basically three general types of equipment commercially available for air dehumidification. One is a rotary dehumidification unit. For the most part, these units are designed for supermarkets, office buildings and hotels. An example is manufactured by ICC Technologies under the trademark "DESI/AIR" which is a latent heat air conditioner that utilizes desiccant cooling with natural gas or steam. This type of unit is not, as commercially available, satisfactory for use for mining operations because exhausted air is recirculated, and the units are not designed to reduce the moisture content to 0.001 kg/kg of air. To remove moisture to a level wherein the water content is less than 0.001 kilogram of water per kilogram of air, a two-stage adsorbent bed or wheel is preferred with the second stage being a zeolite stage, and the first stage may be composed of a silica gel, activated carbon or activated alumina, a hygroscopic salt or another or the same zeolite may be utilized. Nevertheless, considering structure, framework and accessory and auxiliary equipment, existing state-of-the-art dehumidification units such as the DESI-/AIR units, with modifications to be discussed, should be suitable for deep-level mine air conditioning. Other examples of types of units which, with modifications, may be utilized as dehumidification units in accordance with the invention, or that provide useful information and guidance for the construction of such units are disclosed in the following U.S. Patents: U.S. Pat. No. 3,844,737, of Oct. 29, 1974, to Macriss et al; U.S. Pat. No. 4,012,206, of Mar. 15, 1977, to Macriss et al; U.S. Pat. No. 4,081,024, of Mar. 28, 1978, to W. Rush et al; U.S. Pat. No. 4,134,743, of Jan. 16, 1979, to Macriss et al; U.S. Pat. No. 4,402,717, of Sept. 6, 1983, to Izomo et al; U.S. Pat. No. 4,701,189, of Oct. 20, 1987, to Oliker; U.S. Pat. No. 4,769,053, of Sept. 6, 1988, to Fischer, Jr.; and U.S. Pat. No. 4,971,611, of Nov. 20, 1990, to Noguchi.

Another type of dehumidification unit which may be modified for deep-level mines are molecular sieve installations for cracked gas drying or for drying helium gas, such as located at Cities of Service Helex, Inc. at Hickok, Kans. These utilize Zeolite A (4A), which is highly selective for water, and carbon dioxide, and also zeolite calcium A (5A). Inasmuch as the removal of $CO_2$ is generally desirable for deep-level mines, zeolites which are capable of removing such gas as well as moisture and other contaminants such as $NO_x$ and $SO_x$ are advantageous.

Also known liquid absorption equipment such as disclosed in the ASHRAE 1988 EQUIPMENT HANDBOOK, p. 7.2, may be used, depending upon what is otherwise available at the mine's surface plant and/or the general economies incident to initial and operational costs.

Rotary dehumidifiers are desirable because they provide a continuous moving bed, and the resulting conditioning of the air can be maintained more or less constant with relatively few adjustments that can be provided automatically. With fixed bed systems, periodic activation or regeneration of the units are required, and the units must be removed from the air conditioning system as such during such activation or regeneration cycles. However, the units can be manufactured for much greater air drying capacities than is practicable for units having rotating wheels. In either case, heat of adsorption can be utilized to augment the increased temperature which the adsorbents must undergo for regeneration.

FIG. 1 is directed to a fixed bed dehumidifying unit, wherein air that is subsequently conveyed to a mine's working levels is filtered, dehumidified, and cooled. Ambient air is drawn into the unit through a filter 10 by reversible impeller fan 11 at an inlet 12, wherein it is cooled by evaporator coils 14, which are part of a refrigeration system designated generally by reference numeral 15, sufficiently to increase the air's relative humidity to about 100%.

The air cooled by evaporator coils 14 next enters a column 16, which is loosely packed with a desiccant material in granular or pellet form (between 0.2 and 0.4 cm diameters) so that air flows readily therethrough. Although preferably a molecular sieve, zeolite, is used for this purpose, it may be composed of other solid desiccants such as silica gel, activated alumina, activated carbon, or hygroscopic salts. A screen or grating 17 permits the flow of air into the adsorbent or other solid desiccant which is designated generally by reference numeral 20.

Column 16 is connected at its upper aspect to a connecting cover guide 21, which redirects the dried air, flowing through the unit in a direction indicated by arrows 22, 180° into a downwardly directed vertical duct 24, which contains a plurality of heating coils comprising, at its upper aspect, an auxiliary air heater coil 25, and six reclaimer heater coils 26 (the upper of which diagrammatically shows the heat transfer coils and actuating pump), which are not normally activated when the air is being conveyed in the direction indicated by arrows 22. Air from the vertical duct 24 is received in a horizontal duct 27, which contains a one-way louver inlet device 30 that functions as a one-way valve permitting air to enter from vertical duct 24 into horizontal duct 27, but preventing a reverse flow of air.

In horizontal duct 27 are disposed the main cooling evaporation coils 31. The cooled and dried air is discharged in duct 27 through a further air filter 32, and is propelled by a further impeller fan 34 through an outlet louver 35, which is similar to inlet louver 30, into the ventilation inlet 36 for the mine.

It will be understood that the system is hermetically sealed, or at least substantially hermetically sealed, so that all air received initially into inlet 12 is conveyed via column 16, cover guide 21, vertical duct 24, and horizontal duct 27, into the inlet 36 of the mine's air ventilation system. If desired, air received into the unit via air filter 10 can be preconditioned, including being precooled by various means known to the art. The solid desiccant 20 should be of a type provided in sufficient amount to reduce the moisture content of the air flowing through the column 16 into ducts 24 and 27, to less than 0.001 kilograms of moisture or water for each kilogram of air moving therethrough. The solid desiccant 20 may be a mixture of solid desiccants, or several different solid layers of different desiccants may be provided. Moreover, such solid desiccants may also be utilized to remove other contaminants from the air including carbon dioxide.

It is, of course, necessary that the solid desiccant 20 be reactivated or regenerated when required. This is accomplished by securing fan 34 and reversing fan 11 so that the air flow is in the opposite direction as indicated by the dot-dash arrows 37. A number of means for heating the air to effect the reactivation or regeneration of the solid desiccant 20 will occur to those skilled in the art. For example, by using refrigeration system 15 as a heat pump, and evaporator coils 31 as condenser coils, and with certain other modifications, such as changing the position of louver 31 and a further inlet louver 40 at the base of vertical duct 24, a simplified heating system can be provided. However, preferably waste heat is used for this purpose, and, in FIG. 1, a waste heat duct 41 is shown which conducts waste heat from a waste heat source to flow downwardly, as indicated by arrows 42, through a nest of reclaimers 26. These reclaimers 26 efficiently conduct heat energy from the waste heat gases received from the waste heat source, to the coils in the vertical duct 24, so as to heat air which is drawn through the one-way inlet louver 40, by the reverse action of fan 11 upwardly through duct 24, as indicated by dot-dash arrows 37, and downwardly through the solid desiccant 20 to remove the moisture therefrom with the moisturized air eventually being exhausted through an outlet duct 44 and an outlet louver 45. In the event that insufficient heated gas, or gas wherein the temperature is not sufficiently high, is received from the waste heat source into the waste heat duct 41, and auxiliary heater 25, which may be electrical, steam or other suitable heater, is provided in duct 41 to increase the temperature of the fluid received from the waste heat source into duct 41. It should be appreciated that the temperature and amount of fluid which is received through duct 41 in the regeneration cycle must be sufficient to reactivate or regenerate the solid desiccant 20.

Figure 2:
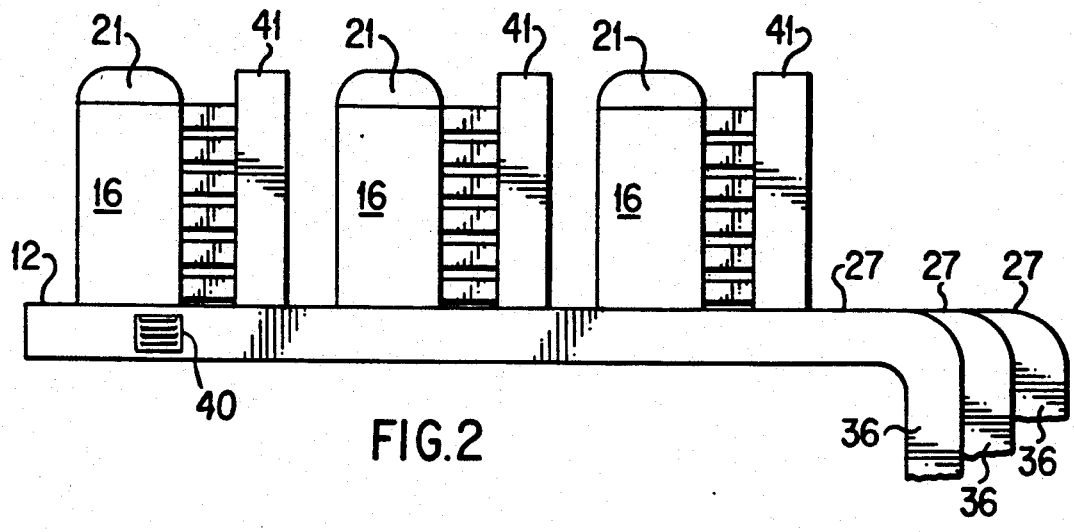
FIG. 2 is a diagrammatical side elevational view showing three units of the type illustrated in FIG. 1 which are disposed in parallel.

It will also be understood that with a system as shown in FIG. 1, several units in parallel must be provided so that there will be a constant supply of ventilation air to the mine, irrespective that one or more of the units are being recycled to regenerate or reactivate the solid desiccants therein. Moreover, it should also be understood that several units can also be placed in series, which may be desirable in specific applications. In FIG. 2, three units are shown which are in parallel to discharge cooled and dried air t the corresponding mine air ventilation inlets 36. Although shown as separate in FIG. 2, such inlets 36 can also be a common inlet or mine shaft which receives or is otherwise interconnected to ducts 27.

Ducts 36 lead to a mine bulk air conditioning ducts 46, each of which contains a ventilation fan 47 and a humidifier 50, at their respective outlets 51 located at a lower working mine level 52, which may be as deep as 4,000 meters or more. In point of fact, the air usually travels through a downcast shaft provided for this purpose in the mine, although, for the purposes of the instant invention, one or more interconnecting shafts or conduits are preferred.

Existing mines receive chilled water which is used to cool the air exhausted from outlets 51. This chilled water flow is indicated by an inlet pipe 53 and an outlet pipe 54 in FIG. 3, and water is diverted from the inlet pipe 53 for humidifying, and thus providing evaporative cooling as well as cooling, per se, to the air received in ducts 46, and discharged from outlets 51 via the humidifiers 50. However, there is, in any event, a considerable amount of water in mines (mine water) that evaporates inherently in the highly dehumidified air received through ducts 46. Although humidification of the air is considered necessary in order to lower the temperature of the air, there may be no particular advantages occasioned by humidifiers 50, except as used on an as-needed basis, to provide evaporative cooling of the ventilation air.

Water which enters the mine must, for the most part, be eventually removed, and it is therefore advantageous to maximize evaporation from other sources of water, whereby that water is removed as moisture in the air exhausted to the surface via shaft 55.

In practice, an economical balance should be maintained which relates to the amount of dried, ventilation air which is being moved, the degree to which it is being cooled at the surface, and the amount of chilling water which is provided to the working levels of the mine. There is, of course, a certain minimum amount of ventilating air which must be supplied to the mine for operational purposes, including the needs of personnel and equipment. To provide further cooling, the volume ventilation air introduced into the mine can be increased. But there are limits on the amount of air which can move through the mine's working levels without its velocity becoming a source of undue problems. Moreover, the temperature of the air entering the mine can be reduced, and eventually to achieve even greater mine depths, this becomes increasingly critical. Finally, there is a cost in the amount of chilled water which is introduced into the mine which relates not only to the water and the cost of chilling same, but also to the conduits which, for efficiency purposes, are usually about 250 mm in diameter. A further consideration is the amount of water which can be carried out of the mine by the humidified air, it being kept in mind that excess mine water must be removed by one means or another in any event. Yet further, inasmuch as the invention is intended to be installed at existing mines, both for economy purposes and to extend the depth at which the mines can be worked, capital investments in equipment that has already been installed should be taken into account. However, in general, the depth of the working levels can be increased to substantial extents first by dehumidifying the ventilation air and subsequently by increasing the cooling of the ventilating air entering the mine by the evaporative coils 31, even after the flow of ventilation air and the cooling effects obtainable by evaporation at working mine levels have been increased to essentially their maximum extent.

Referring to FIGS. 4 and 5, a rotary dehumidification unit designated generally by reference numeral 60 is diagrammatically shown. As set forth above, such units are known although the unit disclosed in the figures is adapted, in particular, for the dehumidification of ventilation air for deep-level mine use.

Unit 60 is mounted in a frame 61 and is generally a parallel-piped configuration of a size for convenient handling and shipping. Thus, it may have a height of up to about eight feet, six inches, a width also of about eight feet, six inches, and a length of 20–40 feet, whereby it corresponds generally in size and configuration to standard internodal shipping containers (ISC) and, indeed, corner fittings 63 having interconnections for such purposes may be disposed at the corners of frame 61. In FIG. 2, an inlet for air is shown at 62 although, in fact, the inlet is more conveniently located at the side or end of the unit. Air is moved into the unit 60 from ambient air by means of a blower fan 64 and precooled by a refrigeration system installed in the unit, not shown in detail, but including inlet evaporation coils 65, intermediate coils and the outlet coils 66. In both this and in the previous embodiment, refrigeration provided by coils 65 may be advantageously controlled automatically to respond to the relative humidity of the air entering at 62 to reduce its temperature sufficiently wherein its relative humidity is increased to about 100%. The air is then guided through the lower part of unit 60, the unit being divided into two parts by a series of shallow V-shaped walls 67, through a first rotating air drying wheel 70, which is rotated at about 0.1 to 0.5 rpm, preferably between about 0.18 and 0.25 rpm. Wheel 70 is rotated by means of a electric motor 71 which turns a pulley 72 having a plurality of grooves for a plurality of belts 74 received in corresponding matching grooves in the periphery or felly of wheel 70. The wheel is a desiccant drying wheel which carries a hygroscopic material, preferably a zeolite or activated carbon, but may be any other suitable material, such as alumina gel or silica gel, or other desiccants that reduce the moisture content of the air passing therethrough to about 0.003 kilograms per kilogram of air or less.

Wheel 70 may be attached to a further desiccant drying wheel 75 that is rotated by its attachment to wheel 70, or is rotated separately by motor 71 via the same type of pulley and belt arrangement or, if desired by a separate motor, at a different speed, and/or in an opposite direction. Drying wheel 75 is preferably composed of a zeolite material for reducing the moisture content in the air to less than 0.001 kilograms per kilogram of air. The air flow, which is represented by arrows 76, is received next through a heat exchange wheel 77, which is rotated by a motor 80 that is similar to motor 71, except that it rotates the heat exchange wheel more rapidly, and/or in the opposite direction of one or both wheels 70 and 75, at about two to about twelve rpm, about five to seven rpm being preferred. The air next moves through the evaporator coil 66 wherein it is cooled to a desired temperature and wherefrom it is received in the mine's ventilation air inlet, such as inlet 36 shown in FIG. 1.

Although, in the embodiment shown, there are two desiccant drying wheels, only one drying wheel as disclosed in U.S. Pat. No. 4,134,743, of Macriss et al, should be sufficient.

Each wheel 70, 75, and 77 is surrounded as seen in FIG. 5 by a cowling or sheet metal piece 81 to ensure that the air flow, represented by arrows 76, passes through the wheels so as to have its moisture removed by the solid desiccant carried by such wheels and does not bypass the wheels same along their sides. The wheels 70, 75 and 77 are firmly supported from stands 82, that mount bearings 84 which receive the axles of the wheels.

Regeneration of the desiccant drying wheels 70 and 75 is accomplished by ambient air being received through an inlet louver 85 wherein the air is preheated by passing through the heat exchange wheel 77 as indicated by arrows 86. Next the air is received by heating coils which may be, in a heat pump type of arrangement, the condenser coils for the refrigeration system that includes the evaporator coils 65, 91 and 66. Alternatively, a waste heat source may be utilized for this purpose. Further, coils 90 from a second and supplementary heat source are provided to raise the temperature of the air sufficiently, if required, so that it will regenerate or reactivate the desiccant material in the drying wheels 70 and 75. Between such wheels, if desired, are provided further evaporated coils 91 in the lower part and/or heating coils 92 in the upper part. The temperature to which the returning air is heated depends upon the particular desiccant used. For example, for most known zeolites the temperature should preferably be 500° F. or higher. But, in general, the temperature should be as low as compatible with rapid and substantially complete regeneration of the desiccant material. Finally, the air, after having reactivated or regenerated wheel 70, is exhausted to the atmosphere at an outlet 94 by means of a blower fan 95.

Figure 3:
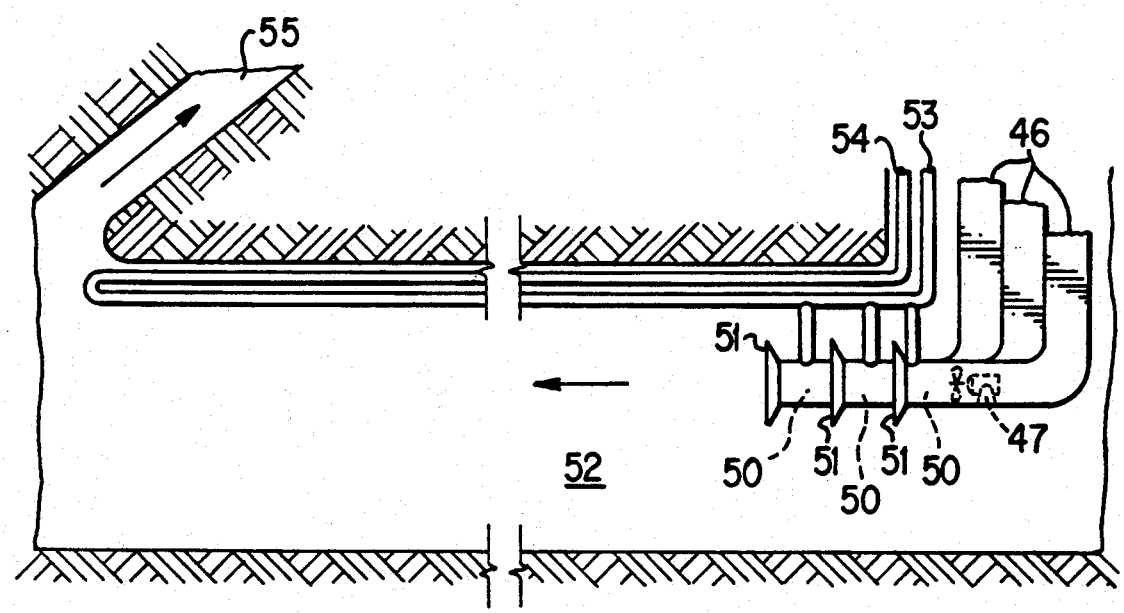
FIG. 3 is a further diagrammatical side elevational view showing a working level of a mine, wherein air ventilation outlets and humidifiers are also disclosed.

Air which is exhausted from coils 6 is directed through duct work, such as ducts 27 (FIGS. 1 and 2), to outlets such as outlets 36 to be received and utilized at the working mine level as previously described with reference to FIG. 3.

For the purposes of most mining operations for which the instant invention is intended a number of units 60 are connected in parallel and there is no need to take an unit out of operation for the purposes of regenerating or reactivating the desiccant material as in the embodiment shown in FIGS. 1 and 2, even though this can be accomplished automatically by appropriate automatic controls regulated by temperature and humidity conditions in the unit. Nevertheless, units 60 can be taken, and will have to be taken, out of operation from time to time for maintenance and repair purposes.

In disposing unit 60 relative to inlets for mine ventilation air, because the frames 61 are stackable via corner fittings 63, in the same manner as intermodal shipping containers, the units can be disposed favorably relative to such ventilation air inlets and removed, replaced and added to, as desired without undue difficulty.

As set forth above, D. Dawes, P. Lloyd and J. Francen, in *An Assessment of the Energy Requirements for Deep-Level Mine Cooling*, describe a deep-level mine wherein the ventilation rate is 700 kg/sec dry air at 8° C. which correspond to 36,000 kw (36 MW(R)) refrigeration. Because the air is precooled to 8° C. (46.5° F.) and the wet bulb temperature is not provided, it can be assumed that the moisture content is less than 0.007 kilograms per kologram dry air. However, this represents a latent heat load on a surface refrigeration plant that requires at least 11.5 MW simply to remove the moisture from the ambient air. Accordingly, by predrying the air, the needed refrigeration capacity of the plant can be reduced by about 11.5 MW.

For a three thousand meter deep mine, the cooling plant required is 60 MW. Accordingly, by using a pre-drying process, the refrigeration capacity is reduced by 36 MW to provide a net refrigeration plant capacity of 24 MW. This is a reduction of about 60% in the size and thus of the cost of such a plant.

For a deep-level mine which has a depth of four thousand meters, the estimated cooling capacity is 80 MW(R). This, when refrigeration capacity of the plant, for the same purpose, may be 44 MW or, in other words, there can be a reduction of 45% in refrigeration capacity, and approximately the same reduction and costs of installation and operation.

The article by A. Patterson, *Ventilation and Refrigeration Considerations in the Design of a Deep/Hot Gold Mine Using Trackless Operations*, describes ventilation and refrigeration requirements planned for a deep gold mine which is to use the trackless mechanized mining method. The mine referred to is the South Deep Project of Johannesburg Consolidated Investment Company Limited which is adjacent to property of the Western Areas Gold Mine on its southern boundary. The mine is to break 210 kilotons of rock per month and will have a mean rock-breaking depth of 2.9 kilometers. The ventilation rate for the mine is 686 kg/sec air rate. It is calculated that by predrying the air, 35 MW(R) evaporative cooling is gained. The projected plant, however, has a refrigeration capacity of 70 MW at a cost of about one hundred million U.S. Dollars. It is estimated that by dehumidifying the ventilation air to 0.001 kilograms of moisture per kilogram of air, the refrigeration load will be reduced by about one-half and the capital savings for the refrigeration plant plus operating cost savings should also be reduced by about one-half or, in other words, by about fifty million dollars for construction of the plant.

Among the articles mentioned above is *Ventilation Arrangements for Merensky Reef Exploitation Below 1,000 m Depth at Rustenburg Platinum Mines Ltd.—Union Section*, by D. Stanton and G. Viljoen. The article relates to the requirements for controlling the underground thermal environment in a mine extension below the 1,000 meter depth at the Rustenburg Platinum Mines, Union Section. Because of the high geothermal gradient experienced, the ventilation strategy includes a centralized 21 MW refrigeration plant that cools the mine chilling water to 0.5° C. at the surface. This article relates to a shallow mine, in a relative sense, of only about 2,000 meters in depth. The ventilation air requirement is 400 kg/sec at 30° C. dry bulb/20° C. wet bulb. The utilization of evaporative cooling as described herein will provide, as calculated about 20.5 MW(R), whereby the proposed 21 MW(R) refrigeration plant could be completely eliminated.

Although I have disclosed the preferred embodiments of my invention, it is to be understood that it is capable of other adaptions and modifications within the scope of the appended claims.

Having thus described my invention, what I claim as new and to be secured by Letters Patent of the United States is:

1. A method of extending the working depth of underground lines which comprises the steps of:
   introducing ambient air into air drying and cooling passageway means disposed at the surface of a mine proximate to the mine's ventilation air inlet;
   removing sufficient moisture from the air by desiccant drying while passing said air through said passageway means and thereby reducing the moisture content in said air to less than 0.001 kilogram of moisture per kilogram of dry air;
   cooling said dry air in said passageway means and introducing said cooled dry air as ventilation air into said underground mine;
   conveying said cooled dried ventilation air to the working level of said underground mine;
   humidifying said cooled dried ventilation air at said working level whereby said air is further cooled at said working level by the evaporation of water therein; and
   exhausting said humidified air from said working level of the mine and conveying said humidified air including the water carried by such air to the surface.

2. A method in accordance with claim 1, wherein about 400 to 800 kg/sec of air is introduced into said mine from such passageway means.

3. A method in accordance with claim 1, wherein the temperature of said air as it enters into said underground mine is adjusted to a temperature in a range of about 0° C. to 20° C.

4. A method in accordance with claim 1, wherein the depth of said mine under the surface is in the range of 3500 to 5500 meters.

5. A method in accordance with claim 4, wherein mine water is used in said humidifying step for adding moisture to said air at said working level.

6. A method in accordance with claim 4, wherein about 1 MW(R) refrigeration capacity is provided for cooling for each of 7 to 20 kg/sec of air introduced into said mine from said passageway means, the ratio of MW(R) refrigeration capacity to kg/sec of air introduced into said mine being an inverse function of the depth of said mine greater than about 2,000 meters under the surface.

7. A method in accordance with claim 1, wherein the moisture in said air is removed from said air introduced into said passageway means by passing said air through pellets of activated zeolite.

8. A method in accordance with claim 7, wherein said air is passed through pellets of an activated adsorbent other than zeolite before being passed through said zeolite pellets.

9. A method in accordance with claim 8, wherein said other adsorbent is a material selected from a group of adsorbents consisting of silica gel, carbon, alumina or a mixture of at least two of said adsorbents.

10. A method in accordance with claim 1, wherein the moisture in said air is removed therefrom by being adsorbed into an activated adsorbent, said activated adsorbent being continuously activated to remove adsorbent moisture therefrom by heating said adsorbent by means of thermal energy provided by a waste heat source fluid.

11. A method in accordance with claim 10, wherein said adsorbent is carried on an endless member which is alternately moved through said passageway means for adsorbing moisture from air passing therethrough and a further passageway means where it is activated by being heated by means of thermal energy provided by said waste heat source.

12. A method in accordance with claim 10, wherein said adsorbent is provided in a plurality of other passageway means in addition to said first mentioned passageway means, said passageway means, including said first mentioned passageway means, being alternately activated by heating and expelling therefrom the moisture each has adsorbed, and air from at least one of said passageway means being introduced at all times into said underground mine whereby the method is continuously operational for introducing sufficient ventilation air into said underground mine.

13. A method of providing air conditioning to underground mines which comprises the steps of:
introducing ambient air into air drying, cooling passageway means disposed at the surface of a mine near the mine's ventilation air inlet;
adsorbing sufficient moisture from said air to reduce the moisture content in said air to less than about 0.001 kilogram of moisture per kilogram of dry air;
conveying said dried air from said passageway means to the working level of said underground mine;
humidifying said dried ventilation air by evaporation of water at said working level sufficiently whereby the air is cooled to at least 25° dry bulb/20° C. wet bulb; and
exhausting said humidified air from the working level to the surface of said mine.

14. A method in accordance with claim 13, wherein said humidifying step comprises the moisturizing of said dried ventilation air with mine water.

15. A method in accordance with claim 13, wherein said air is moved within said passageway means through pellets of activated zeolite that adsorb moisture and carbon dioxide from said air.

16. A method in accordance with claim 15, wherein said air is moved within said passageway means through a further substance that removes moisture therefrom prior to moving through said activated zeolite pellets.

17. A method in accordance with claim 16, wherein said further substance and said zeolite pellets are continuously reactivated by alternately heating same to drive off the moisture therein.

18. An apparatus for conditioning air in deep underground mines which comprises the combination of:
air passageway means disposed between an air inlet for receiving air from the atmosphere and an air outlet at the working level of said mine;
said air passageway means defining an air treatment passageway and a regenerative air passageway;
an activated adsorbent selectively alternately disposed in said air treatment passageway for removing moisture from air passing therethrough so that the air as received at said outlet has less than about 0.001 kilograms of water per kilogram of air, and in said regenerative air passage wherein moisture is removed from said adsorbent;
a humidifying means at said air outlet at the mine's working level for adding sufficient moisture to said air to adjust the temperature of said air to not more than 25° C. dry bulb/20° C. wet bulb; and
exhaust means for exhausting said humidified air to the surface.

19. An apparatus in accordance with claim 18, further comprising refrigeration means for cooling said air between said adsorbent and said humidifying means.

20. An apparatus in accordance with claim 18, wherein said adsorbent is composed of a molecular sieve.

* * * * *